US008196786B2

(12) United States Patent
Charlier et al.

(10) Patent No.: US 8,196,786 B2
(45) Date of Patent: Jun. 12, 2012

(54) DISPENSING CLOSURE COMPRISING A SAFETY SYSTEM

(75) Inventors: Christophe Jean-Marie Yves Charlier, Parma (IT); Bruno Sadi Henri Delande, Marseille En Beauvaisis (FR); Jean-Francois Andre Aime Delaunay, La Chapelle Aux Pots (FR); Pierre Henri Lebrand, Bonlier (FR)

(73) Assignee: Nestec S.A., Vevey (CH)

( * ) Notice: Subject to any disclaimer, the term of this patent is extended or adjusted under 35 U.S.C. 154(b) by 968 days.

(21) Appl. No.: 12/278,949

(22) PCT Filed: Feb. 14, 2007

(86) PCT No.: PCT/EP2007/051416
§ 371 (c)(1),
(2), (4) Date: Aug. 8, 2008

(87) PCT Pub. No.: WO2007/093612
PCT Pub. Date: Aug. 23, 2007

(65) Prior Publication Data
US 2009/0236375 A1    Sep. 24, 2009

(30) Foreign Application Priority Data

Feb. 14, 2006 (EP) .................................... 06101630

(51) Int. Cl.
B22D 37/00    (2006.01)
(52) U.S. Cl. ........................... 222/590; 222/513; 137/72
(58) Field of Classification Search .................. 222/54, 222/402.11, 509, 514, 518, 525, 590; 251/149.1; 137/614.2, 72
See application file for complete search history.

(56) References Cited

U.S. PATENT DOCUMENTS 4,744,382 A * 5/1988 Visnic et al. ................ 137/68.23
5,111,837 A * 5/1992 Morris et al. .................... 137/72
(Continued)

FOREIGN PATENT DOCUMENTS
EP    1065150 B1    9/2004
(Continued)

OTHER PUBLICATIONS

International Search Report, Application No. PCT/EP2007/051416 and Written Opinion.

*Primary Examiner* — Kevin P Shaver
*Assistant Examiner* — Melvin Cartagena
(74) *Attorney, Agent, or Firm* — Winston & Strawn LLP

(57) ABSTRACT

A dispensing closure for a container that includes closure walls, at least one dispensing aperture, at least one closing element that is movable between a position where the aperture is closed, and a position where the aperture is open. This closure includes at least one actionable member that surrounds the closure walls and the closing element, and at least one connection element located between the actionable member and the closing element. The connection element is made of a material that is sufficiently rigid below a predetermined safety temperature, to connect the actionable member and closing element, thus allowing opening of the dispensing aperture by moving the actionable member and fluid above temperature so that the actionable member and closing element are disconnected. A temperature dependent connection material is filled into at least one cavity in the actionable member or in the closing element while the temperature dependent connection material is in its liquid state, and is subsequently cooled to form the connection element.

16 Claims, 6 Drawing Sheets

U.S. PATENT DOCUMENTS

| | | | |
|---|---|---|---|
| 6,257,463 B1 | 7/2001 | DePolo | 222/525 |
| 6,367,499 B1 * | 4/2002 | Taku | 137/72 |
| 7,150,287 B2 * | 12/2006 | Kita et al. | 137/72 |
| 2002/0190087 A1 | 12/2002 | Vakiener et al. | 222/525 |

FOREIGN PATENT DOCUMENTS

| | | |
|---|---|---|
| EP | 1591376 B1 | 3/2008 |
| WO | WO03/086892 A1 | 10/2003 |
| WO | WO2006/077087 A2 | 7/2006 |
| WO | WO2006/077097 A1 | 7/2006 |

* cited by examiner

DISPENSING CLOSURE COMPRISING A SAFETY SYSTEM

This application is a 371 filing of International Patent Application PCT/EP2007/051416 filed Feb. 14, 2007.

BACKGROUND

The present invention relates to the production of a dispensing closure for a container, preferably a pressurized container for containing a frozen viscous product. It is known to use pressurized containers comprising dispensing valves. A dispensing valve allows a consumer to efficiently dose and dispense the product. An example of such a container with a dispensing closure is described in EP-A-1591376.

The dispensing closure produced according to the present invention has a safety system that prevents dispensing of the contained product when the temperature of the container is above a predetermined safety temperature. More precisely, the safety system ensures that a consumer cannot actuate the dispensing valve system when the product is too fluid.

In the following description and for the sake of the clarity of the description, the product contained in the container of the invention is described as soft ice cream. It has been found that soft ice cream and similar products have to be dispensed from the container in which they are stored at a certain predetermined temperature. For the soft ice cream to have a nice appearance to the consumer when it is dispensed, it is known that the dispenser has to be at a temperature less than about −15° C. More importantly, for soft ice cream that is stored in a pressurized container, if the container is too warm and therefore the ice cream is too fluid, there is a risk that ice cream squirts out of the container opening with force. However, it should be understood that this example is not limitative, and that other types of temperature sensitive products can also suitably be packaged in the container of the invention.

European Patent Application no 05100386.1 and no 05100397.8 describe a container for storing and dispensing a product, said container comprising:

(i) a container body having an opening, for containing the product, (ii) a dispensing closure attached to the container body opening, and comprising closure walls, at least one dispensing aperture, at least one closing element that is movable relative to the closure walls between a first position where said dispensing aperture is closed, and a second position where the dispensing aperture is open and the product is dispensed, said closure further comprising at least one actionable means that surrounds said closure walls and said closing element, (iii) a spring element disposed between said closing element and said closure walls, so as to naturally force the closing element in a position where it closes said aperture.

The dispensing closure of European Patent Applications no 05100386.1 and no 05100397.8 further comprises at least one connection element that is disposed between said actionable means and said closing element, said connection element being made of a material that is:

rigid enough, when the temperature of the container is below a predetermined safety temperature, to connect said actionable means and said closing element, thus allowing a consumer to open the dispensing aperture by moving said actionable means, and fluid when the temperature of the container is above said safety temperature, so that said actionable means and said closing element are disconnected, thus preventing a consumer to open the dispensing aperture when moving said actionable means. The present invention now provides a process for manufacturing such a connection element.

SUMMARY OF THE INVENTION

According to the present invention, a process for filling the temperature dependent connection material into a dispensing closure of the type comprising closure walls, at least one dispensing aperture, at least one closing element that is movable relative to the closure walls between a first position where said dispensing aperture is closed and a second position where the dispensing aperture is open and the product is dispensed, said dispensing closure further comprising at least one actionable means that surrounds said closure walls and said closing element and a spring element disposed between said closing element and said closure walls, so as to naturally force the closing element in a position where it closes said aperture, said dispensing closure further comprising at least one connection element that is disposed between said actionable means and said closing element, said element being made of a temperature dependent material that is rigid enough, when the temperature of the container is below a predetermined safety temperature, to connect said actionable means and said closing element, thus allowing a consumer to open the dispensing aperture by moving said actionable means, and liquid when the temperature of the container is above said safety temperature, so that said actionable means and said closing element are disconnected, said filling process being characterized in that the temperature dependent connection material is filled into at least one cavity in the said actionable means and/or the said closing element while the temperature dependent connection material is in its liquid state, and is subsequently cooled to form the connection element.

In a highly preferred embodiment of the invention, the safety temperature is comprised between −35° C. and +50° C., even more preferably comprised between −25° C. and −10° C.

In a preferred embodiment of the dispensing closure, the actionable means comprises an outer ring that surrounds said closing element.

In a first embodiment of the dispensing closure, the closure walls can define a vertical cylindrical channel which is in fluid contact with the interior of the container body, and which comprises at least one lateral dispensing aperture in its upper part, said closing element having the shape of a ring that seals around the channel, and is movable relative to said channel by translation along an axis which is parallel to the longitudinal axis of the channel when the outer ring and the closing element are connected and the outer ring is moved downwards (towards the container).

In this case, said closing element preferably comprises a first horizontal groove located in the periphery of its outer surface, and said outer ring comprises a second horizontal groove located in the periphery of its inner surface. Preferably, a spring element is located between the closing ring and the closure walls so as to force said closing ring into a position where it closes the dispensing aperture and the first and second grooves face each other, said connection element of temperature dependent material being disposed in said first and second grooves to form a key connecting the closing element and the outer ring.

Advantageously, the upper outer surface of said closing element protrudes out of said inner ring when said connection element is fluid and said outer ring is moved downwards by the consumer. Said upper outer surface thus revealed may carry indications to the consumer that the container temperature is above the safety temperature.

In a second embodiment of the dispensing closure, the closure walls can define a vertical cylindrical channel which is in fluid contact with the interior of the container body, and comprises at least one lateral dispensing aperture in its upper part, said closing element having the shape of a ring that seals around the said channel, and is movable relative to said channel by rotation around an axis which is parallel to the longitudinal axis of the channel when the outer ring and the closing element are connected and the outer ring is rotated.

In the latter embodiment, said closing element preferably comprises a first vertical groove located in the periphery of its outer surface, and said closing ring comprises a second vertical groove located in the periphery of its inner surface, said first and second grooves being disposed such that they face each other when the closing ring closes the dispensing aperture. Said connection element of temperature dependent material is disposed in said first and second grooves.

The container may have a pin attached to the closure walls and located inside the nozzle, and having a length such that it is normally arranged inside the nozzle, but protrudes out of said nozzle when the actionable means and the closing means are pulled downwards by the consumer. This pin acts as a "too cold" indicator, that warns the consumer when the contents is too cold to be dispensed. In this case, the product does not flow out of the container because it is solid, or at least too viscous, and therefore when the consumer pulls onto the actionable means, the pin protrudes out of the nozzle and is visible to the consumer. If the product is warm enough to flow out of the container, then it is dispensed and flows out of the nozzle, thus hiding the "too cold" indicator that is located inside said nozzle.

In one process according to the invention, the liquid temperature dependent connection material is filled into said at least one cavity through at least one aperture in the end of the closing element remote from the container in use. After the filling step each aperture can be closed with a plug. Alternatively, each aperture may be sealed by a self-closing membrane. In this case, the liquid temperature dependent connection material can be filled into each cavity through the membrane by a syringe, without requiring subsequent plugging of the aperture. The aperture may extend as a ring around the closing element. In this case the plug can be a ring of plastic material forming a watertight seal.

In an alternative process according to the invention, the closing element is formed of a lower part nearer the container in use and an upper part further from the container in use, and the said lower part is assembled with the said actionable means to form an assembly containing said at least one cavity and having an opening at the top. The liquid temperature dependent connection material is filled into said at least one cavity through the opening. The upper part of the closing element can subsequently be assembled with the said assembly, thereby sealing the opening.

In a further alternative process according to the invention, the closing element and the actionable means are immersed in the liquid temperature dependent connection material and are assembled together inside the liquid temperature dependent connection material to form the dispensing closure.

In a yet further process according to the invention, in which the said actionable means is an outer ring surrounding the closing element, the liquid temperature dependent connection material is filled into said at least one cavity through at least one aperture in the outer ring. After the filling step, each aperture can be closed with a plug. Alternatively, each aperture may be sealed by a self-closing membrane. In this case, the liquid temperature dependent connection material can be filled into each cavity through the membrane by a syringe, without requiring subsequent plugging of the aperture.

BRIEF DESCRIPTION OF THE DRAWINGS

The invention will now be described in greater detail, with reference to the attached set of drawings, which represent one embodiment of a container according to the present invention. The following example is given by way of illustration only and in no way should be construed as limiting the scope and subject matter of the invention as described and claimed.

DETAILED DESCRIPTION OF THE INVENTION

In the following description, and for the sake of clarity, the container, as well as all of its components, is considered in the vertical position, so that the closed side of the container body is in contact with a flat horizontal support, and the side of the container body to which the closure is attached is oriented upwards.

Figure 1:
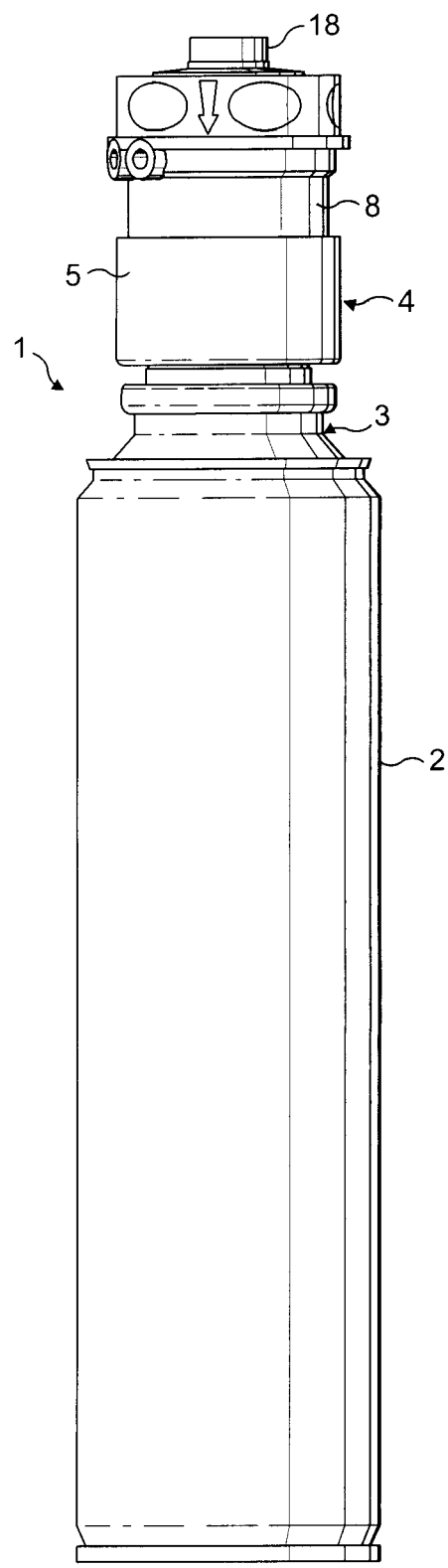
FIG. 1 is a profile view of a container closed with a dispensing closure of the type to which the present invention applies.

FIG. 1 represents one embodiment of a container having a dispensing closure of the type to which the present invention applies. The container 1 represented in FIG. 1 is a pressurized container for storing and dispensing a frozen viscous product, for example soft ice cream.

Figure 2:
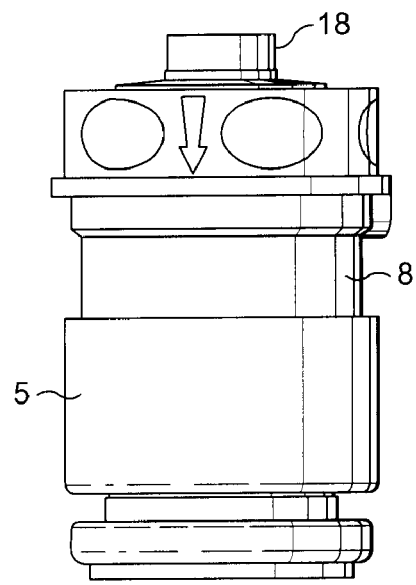
FIG. 2 is a profile view of a closure of the type to which the invention applies.

The container 1 comprises a container body 2 for containing the product having an opening 3, and a dispensing closure 4 sealingly attached to the container body opening 3 which is represented in an enlarged view in FIG. 2.

The dispensing closure 4 comprises closure walls 5, at least one dispensing aperture 6, at least one closing element 7 that is movable relative to the closure walls between a first position where said dispensing aperture 6 is closed, and a second position where the dispensing aperture is open and the product is dispensed.

The closure 4 further comprises at least one actionable means 8 that surrounds said closure walls 5 and said closing element 7. In the embodiment shown in FIGS. 2 to 5, the actionable means 8 comprises an outer ring that surrounds and is movable relative to said closing element 7.

Figure 3:
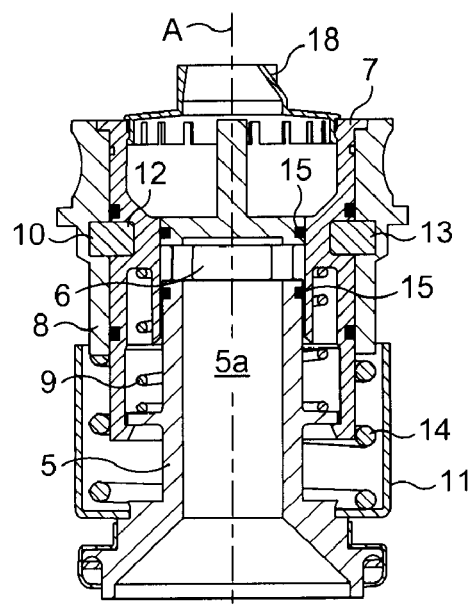
FIG. 3 is a profile cut view of a closure of the type to which the invention applies, in the closed configuration.

As seen in FIG. 3, a spring element 9 is disposed between said closing element 7 and said closure walls 5, so as to naturally force the closing element in a position where it closes said aperture 6.

The dispensing closure 4 further comprises at least one connection element 10 that is disposed between said actionable means 8 and said closing element 7. Said connection element 10 is a key made of a temperature dependent material that is:

rigid enough, below a predetermined safety temperature, to connect said actionable means 8 and said closing element 7, thus allowing a consumer to open the dispensing aperture 6 by moving said actionable means 8, and fluid, at or above said safety temperature, so that said actionable means 8 and said closing element 7 are disconnected, thus preventing a consumer to open the dispensing aperture 6 when moving said actionable means.

The temperature dependent material that is used for the connecting means 10 can comprise any eutectic material suitable for meeting the melting conditions stated above. It can be a pure liquid, or a mixture. It can be for example water, an aqueous solution, a propylene glycol based mix, an alcohol based mix, or even the same product as is contained inside the container body. In the embodiment of the invention that is currently described, and having regard to the fact that the product contained inside the container is soft ice cream, the safety temperature is around −15° C.

In the first embodiment of the dispensing closure that is represented in FIGS. 2 to 5, the closure walls 5 define a vertical cylindrical channel 5a which is in fluid contact with the interior of the container body 2. The channel 5a comprises a lateral dispensing aperture 6 in its upper part, and a shoulder portion 11 in its lower part. The closing element 7 has the shape of a ring that seals around the channel 5a, and is movable relative to said channel by translation along an axis A which is parallel to the longitudinal axis of the channel 5a.

Figure 4:
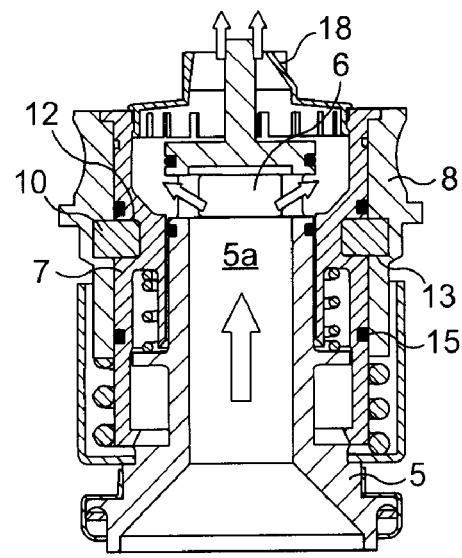
FIG. 4 is a profile cut view of the closure of FIG. 3 in the open configuration.

In this latter case, as represented in FIGS. 3 and 4, the closing element 7 comprises a first horizontal groove 12 located in the periphery of its outer surface, and said outer ring 8 comprises a second horizontal groove 13 located in the periphery of its inner surface. The first and second grooves 12, 13 are disposed such that they face each other when the outer ring 8 closes the dispensing aperture 6, as represented in FIG. 3, and the connecting element 10 is disposed in said first and second grooves that both form an annular horizontal cavity.

A spring element 14 is located between the closing ring 7 and the closure walls 5 so as to force said ring in a position where the first and second grooves face each other. More precisely, this spring element 14 presses on the closure walls in the region of the shoulder 11.

In the region of the connecting element 10, the surfaces of the outer ring 8 and the closing ring 7 contact each other in a fluid-tight manner. The tightness is achieved by two horizontal annular joints 15 that are disposed between the closing ring and the outer ring. Both joints 15 are distant from each other so that the first and second grooves 12, 13 are contained in the space in-between the joints 15, as shown in FIGS. 4 and 5.

Similar tightness joints are disposed between the channel and the inner ring.

At rest, the closing ring 7 is in the upward position and closes the lateral opening of the dispensing channel 5a, as represented in FIG. 3. Simultaneously, the outer ring 8 is also in the upward position as represented in FIG. 3. The first and second grooves 12, 13 of the closure face each other as represented in FIG. 3.

Figure 5:
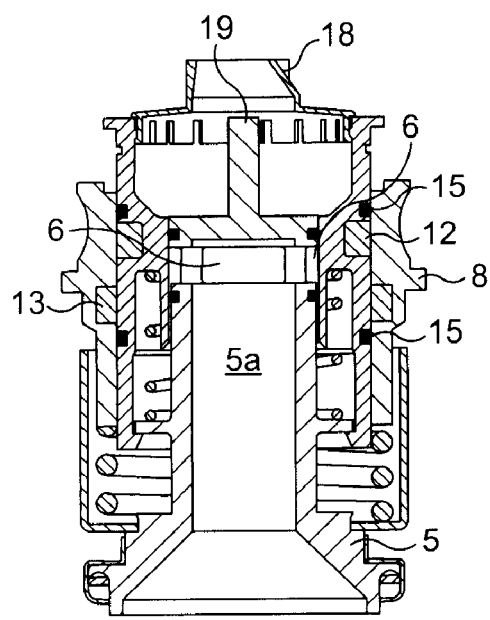
FIG. 5 is a profile cut view of the closure of FIGS. 3 and 4 in the safety configuration.

When the consumer wishes to dispense some ice cream, he/she pulls the outer ring 8 downwards, as is represented in FIG. 5. If the container temperature is below the predetermined safety temperature (for example less than −15° C. in the present example), pulling the outer ring leads the closing ring 7 downward as well, since both closing and outer rings are connected to each other by the rigid key 10. The closing element is moved to the position shown in FIG. 4. Ice cream can flow upwards, out of the channel 5a through the lateral dispensing aperture 6, as shown by arrows in FIG. 4. A nozzle 18 can be added to give a particular shape to the dispensed product.

If the container temperature is too high, the temperature dependent material of key element 10 will become fluid, and will no longer connect the closing ring 7 and the outer ring 8. In that case, as shown in FIG. 5, pulling downward the outer ring 8, will not lead the closing ring 7 downwards as well, and the channel dispensing aperture 6 will stay closed.

In that configuration, the outer upper surface of the closing ring becomes visible to the consumer, as shown in FIG. 5, and this visible portion can advantageously be printed with a message (not represented in the drawings), informing the consumer that the container temperature is too high for dispensing the contents.

If the container temperature is too low, the ice cream may be too viscous to flow. In this case, at the time the consumer pulls the outer ring downwards, the ice cream does not flow. Preferably, it is arranged that at this time the consumer can see a "too cold" indicator 19 which protrudes out of the nozzle 18, and which is marked for example with the wording "too cold". The "too cold" indicator may have the shape of a pin attached to the closure walls and located inside the nozzle, and having a length such that it is normally within the nozzle, but protrudes out of said nozzle when the actionable means and the closing element are pulled downwards by the consumer. At correct dispensing temperature, the ice cream flows out of the container nozzle as shown in FIG. 4, thereby hiding the "too cold" indicator.

A set of instructions may be given to the consumer on the container, explaining what is the best dispensing temperature range. If the container temperature is too low, the consumer can warm it, for example by letting it out of the freezer at room temperature until the container temperature is higher enough.

In all cases, when the consumer releases the outer ring, said ring is forced upward by the spring element located between said outer ring and the closure walls, as it is illustrated in FIG. 3.

In an alternative embodiment of the dispensing closure (not represented in the drawings), the closure walls can define a vertical cylindrical channel which is in fluid contact with the interior of the container body, and comprises at least one lateral dispensing aperture in its upper part, said closing element having the shape of a ring that surrounds said channel, and is movable relative to said channel by rotation around an axis which is parallel to the longitudinal axis of the channel, a spring element being located between the closing ring and the closure walls so as to force said ring in a position where the first and second grooves face each other.

In this second embodiment, said closing element comprises a first vertical groove located in the periphery of its outer surface, and said outer ring comprises a second vertical groove located in the periphery of its inner surface, said first and second grooves being disposed such that they face each other when the closing ring closes the dispensing aperture. The connecting element of temperature dependent material is disposed in said first and second grooves.

The functionality of the dispensing closure in this second embodiment does not change compared to that of the first embodiment described above. In this case, the dispensing of the product is achieved by rotating the outer ring around its longitudinal axis, instead of translating it downwardly as was the case for the first embodiment of the invention.

Figure 6:
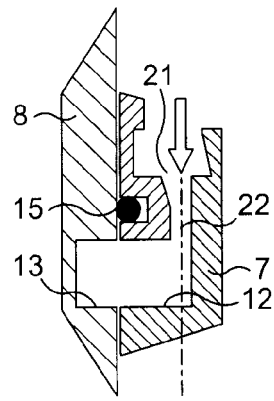
FIG. 6 is a diagrammatic enlarged profile cut view of part of the closure of FIGS. 3 to 5 in the region of the connecting element before filling with the temperature dependent material.
Figure 7:
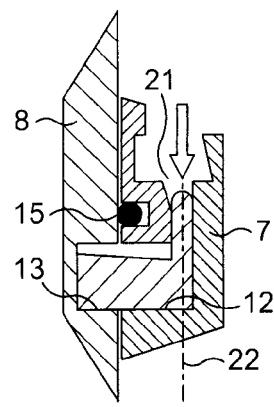
FIG. 7 is a diagrammatic enlarged profile cut view of part of the closure of FIGS. 3 to 5 in the region of the connecting element during filling with the temperature dependent material.
Figure 8:
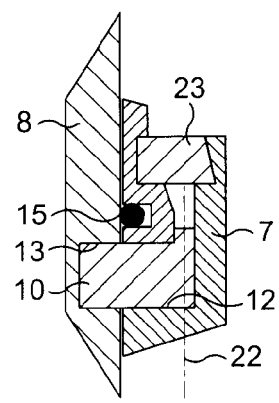
FIG. 8 is a diagrammatic enlarged profile cut view of part of the closure of FIGS. 3 to 5 in the region of the connecting element after filling with the temperature dependent material and subsequent sealing.

In the method of filling shown in FIGS. 6 to 8, the closing element 7 has an aperture 21 in its upper surface. The aperture leads through channel 22 to the groove 12 in the outer surface of closing element 7. When the dispensing closure is in its rest position represented in FIG. 3, the groove 12 faces the groove 13 in outer ring 8. The dispensing closure is filled with temperature dependent material while it is in this rest position. The temperature dependent material is introduced in liquid form through aperture 21 and fills both groove 12 and groove 13, thus forming the connecting element or key 10 connecting closing element 7 and outer ring 8. After the grooves 12 and 13 have been filled, a watertight plug 23 is applied to aperture 21 to seal the aperture. The aperture 21 can be a single aperture, a series of apertures or a continuous aperture ring around the top of closing element 7. Plug 23 is shaped accordingly. The plug 23 is formed for example from resilient plastics material.

After the grooves 12 and 13 have been filled, the closure 4 can be cooled to solidify the key 10.

Figure 9:
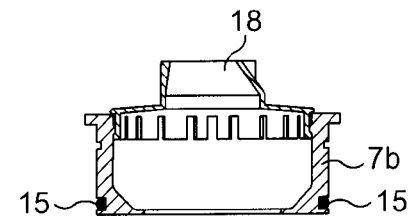
FIG. 9 is a profile cut view of a closure of the type shown in FIGS. 3 to 5, wherein the closing assembly in made of two parts, during assembly.
Figure 9:
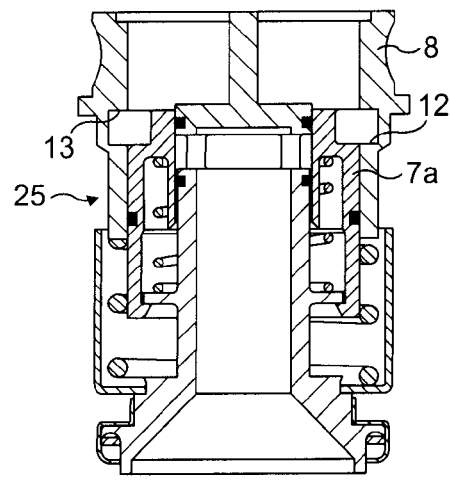

In the process represented in FIG. 9, the closing element 7 is formed from a lower part 7a and an upper part 7b which is the part above groove 12. The lower part 7a is assembled with the actionable means 8 to form an assembly 25 in which the groove 12, and thereby the groove 13 in actionable means 8, are accessible from above. The temperature dependent material can be introduced in liquid form to fill grooves 12 and 13 and thus form the connecting element or key 10. The upper part 7b of the closing element is then assembled with the assembly 25 and sealed with watertight seals 15.

The process of FIG. 9 can be carried out with the assembly 25 in position as the closure of container 1. The container 1 is first filled with soft ice-cream. The assembly 25 is applied to close the container. The container and assembly 25 are cleaned. The grooves 12 and 13 are filled with temperature dependent material in liquid form as described above. In one embodiment of the invention, the liquid used for cleaning can also be used as the temperature dependent material. The upper part 7b of the closing element is then applied to seal the temperature dependent material in the closure 4. The closed container can then be cleaned and dried, and stored at a suitable temperature (between −15° C. and −25° C.) for soft ice-cream. Storage at this temperature will solidify the temperature dependent material to form a rigid key 10.

A similar procedure of filling the container then filling the temperature dependent material into the closure can if desired be used for the process of FIGS. 6 to 8.

Figure 10:
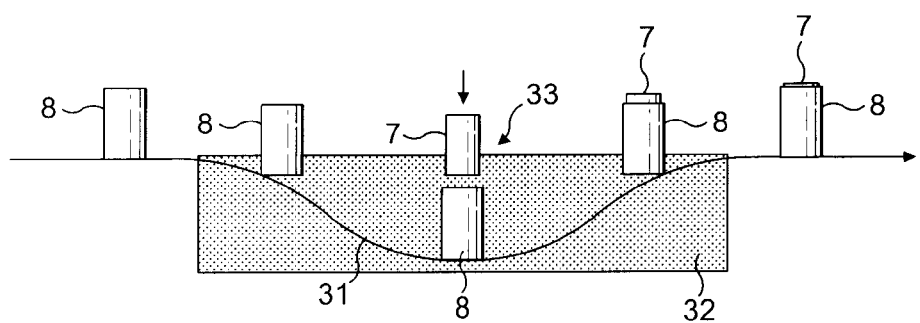
FIG. 10 is a diagrammatic side elevation of an alternative production process for the assembly of a closure of the type shown in FIGS. 3 to 5.

In the process represented in FIG. 10, the outer ring 8 of the closure is carried by a conveyor 31 through a bath 32 of the temperature dependent material in its liquid state. This fills the grooves 13 in the outer ring. As each outer ring 8 passes the assembly station 33, the closing element 7 is assembled with the outer ring inside the liquid 32. This automatically fills the grooves 12 in the closing element 7. After being thus assembled, the closing element and outer ring are cleaned and dried before assembling with the other components of the dispensing closure.

Figure 11:
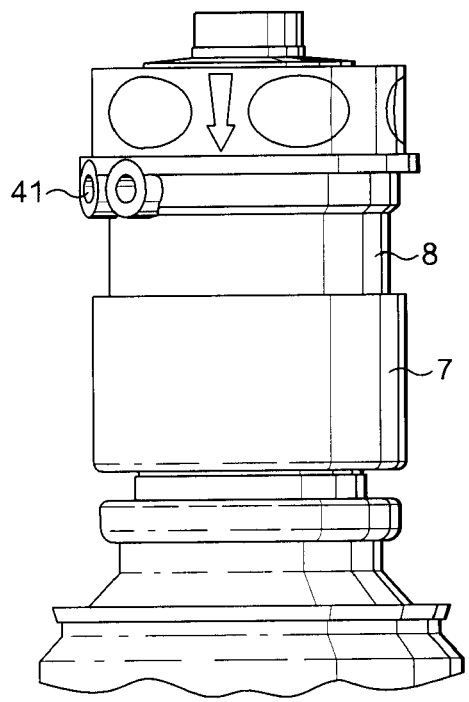
FIG. 11 is a profile view of a closure of the type shown in FIGS. 2 to 5 that can be filled by an alternative procedure.
Figure 12:
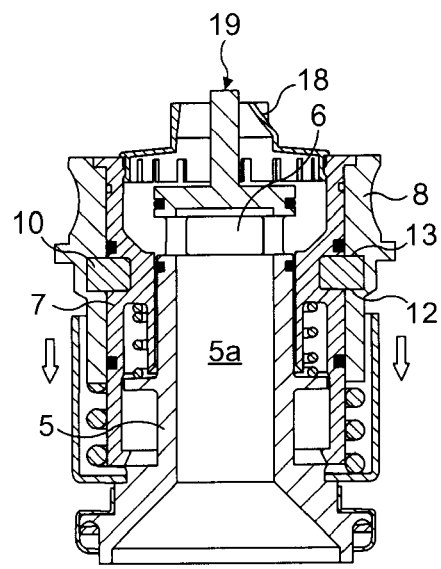
FIG. 12 is a profile cut view of the closure of FIG. 11.

The dispensing closure represented in FIGS. 11 and 12 is of the same type as that of FIGS. 2 to 5 but has at least one lateral aperture 41 in the outer ring 8. As seen in FIG. 12, the aperture 41 communicates with the groove 13 in outer ring 8 and thereby with the groove 12 in closing element 7. The temperature dependent material in its liquid state is fed into the closure through the aperture 41 until the grooves 13 and 12 are filled. The or each aperture 41 can then be closed with a plug (not shown), for example a plug similar to that represented in FIG. 8.

As an alternative to an open aperture that is subsequently closed with a plug, the aperture 41 can contain a self-sealing membrane across the aperture. In this case the grooves 13 and 12 can be filled by injecting the temperature dependent material in its liquid state by a syringe passing through the membrane.

What is claimed is:

1. A process for filling temperature dependent connection material into a dispensing closure that includes:
    closure walls,
    at least one dispensing aperture,
    at least one closing element that is movable relative to the closure walls between a first position where the dispensing aperture is closed and a second position where the dispensing aperture is open and the product is dispensed,
    at least one actionable means that surrounds the closure walls and closing element and that includes a spring element disposed between the closing element and closure walls, so as to naturally force the closing element in a position where it closes the aperture,
    at least one connection element that is disposed between the actionable means and closing element, with the element being made of a temperature dependent material that is sufficiently rigid when the temperature is below a predetermined safety temperature, to connect the actionable means and closing element, thus allowing a consumer to open the dispensing aperture by moving the actionable means, and liquid when the temperature is above the safety temperature, so that the actionable means and closing element are disconnected,
    wherein the process comprises filling the temperature dependent connection material into (a) at least one cavity in the actionable means that extends to the closing element, or (b) at least one cavity in the closing element that extends to the actionable means, with the filling occurring while the temperature dependent connection material is in its liquid state to help form the connection element.

2. The process according to claim 1, wherein the temperature dependent connection material is cooled to form the connection element subsequently to filling.

3. The process according to claim 1, wherein the temperature dependent connection material is filled into at least one cavity in the actionable means.

4. The process according to claim 1, wherein the dispensing closure comprises a container, with the container associated with the closing element, wherein the liquid temperature dependent connection material is filled into the at least one cavity through at least one aperture in an end of the closing element remote from the container in use.

5. The process according to claim 4, wherein after filling, each aperture is closed with a plug.

6. The process according to claim 5, wherein the aperture extends as a ring around the closing element and the plug is a ring of plastic material forming a watertight seal.

7. The process according to claim 4, wherein the closing element is formed of a lower part nearer the container in use and an upper part further from the container in use, and the lower part is assembled with the actionable means to form an assembly containing the at least one cavity and having an opening at the top, with the liquid temperature dependent connection material filled into the at least one cavity through the opening, and the upper part of the closing element is subsequently assembled with the assembly thereby sealing the opening.

8. The process according to claim 4, wherein each aperture is sealed by a self-closing membrane and the liquid temperature dependent connection material is filled into the at least one cavity through the membrane by a syringe.

9. The process according to claim 1, wherein the closing element and the actionable means are immersed in the liquid temperature dependent connection material and are assembled together when the material is in its liquid state.

10. The process according to claim 1, wherein the actionable means is a member that is operatively associated with the closing element and is configured to facilitate the filling of the liquid temperature dependent connection material filled into the at least one cavity.

11. The process according to claim 1, wherein the actionable means is an outer ring surrounding the closing element with the liquid temperature dependent connection material filled into at least one cavity through at least one aperture in the outer ring.

12. The process according to claim 11, wherein after filling each aperture is closed with a plug.

13. The process according to claim 11, wherein each aperture is sealed by a self-closing membrane and the liquid temperature dependent connection material is filled into the at least one cavity through the membrane by a syringe.

14. In a dispensing closure that includes:
closure walls,
at least one dispensing aperture,
at least one closing element that is movable relative to the closure walls between a first position where the dispensing aperture is closed and a second position where the dispensing aperture is open and the product is dispensed,
at least one actionable means that surrounds the closure walls and closing element and that includes a spring element disposed between the closing element and closure walls, so as to naturally force the closing element in a position where it closes the aperture, and
at least one connection element that is disposed between the actionable means and closing element, with the element being made of a temperature dependent material that is sufficiently rigid when the temperature is below a predetermined safety temperature, to connect the actionable means and closing element, thus allowing a consumer to open the dispensing aperture by moving the actionable means, but which is liquid when the temperature is above the safety temperature, so that the actionable means and closing element are disconnected,
the improvement which comprises filling a temperature dependent connection material into (a) at least one cavity in the actionable means that extends to the closing element, or (b) at least one cavity in the closing element that extends to the actionable means, with the filling occurring while the temperature dependent connection material is in its liquid state to form the connection element.

15. The process according to claim 14, wherein the temperature dependent connection material is filled into the cavity of the actionable means or the closing element through an aperture that is sealed by a self-closing membrane.

16. The process according to claim 15, wherein the temperature dependent connection material is filled into the cavity of the actionable means or the closing element through an aperture that is sealed by a self-closing membrane.

* * * * *